Oct. 4, 1960 H. J. BERNARD ET AL 2,954,970

OVERLOAD SPRING

Filed Dec. 3, 1956

INVENTORS
HERBERT J. BERNARD
BY JOSEPH A. MORGAN
Albert J. Fihe
ATTORNEY

United States Patent Office 2,954,970
Patented Oct. 4, 1960

2,954,970

OVERLOAD SPRING

Herbert J. Bernard and Joseph A. Morgan, both of 11260 Penrose St., Sun Valley, Calif.

Filed Dec. 3, 1956, Ser. No. 625,925

3 Claims. (Cl. 267—45)

This invention relates to an overload spring and has for one of its principal objects, the provision of a device of the class described which will supplement the ordinary automobile, or other vehicle, spring in such a manner that the original spring will not be subject to distortion or breakage in the event of excess loads or rough usage.

One of the important objects of this invention is to provide an auxiliary spring which can be readily and simply applied to the usual automobile, or similar, spring with practically no tools and with a minimum expenditure of time and labor.

Another object of the invention is the provision of an overload spring for automotive vehicles which is readily adjustable to fit practically any type of such springs, particularily the rear leaf springs and which accordingly can be adapted for cars of various sizes with ease.

Another, and still further important, object of the invention is to provide a spring as aforesaid, which when placed in position, will remain in such fixed position and securely safeguard the spring under all conditions of handling and usage.

Other and further important objects of the invention will be apparent from the disclosures in the accompanying drawings and following specification.

The invention, in a preferred form, is illustrated in the drawings and hereinafter more fully described.

Figures 1, 2, 3, 4, 5:
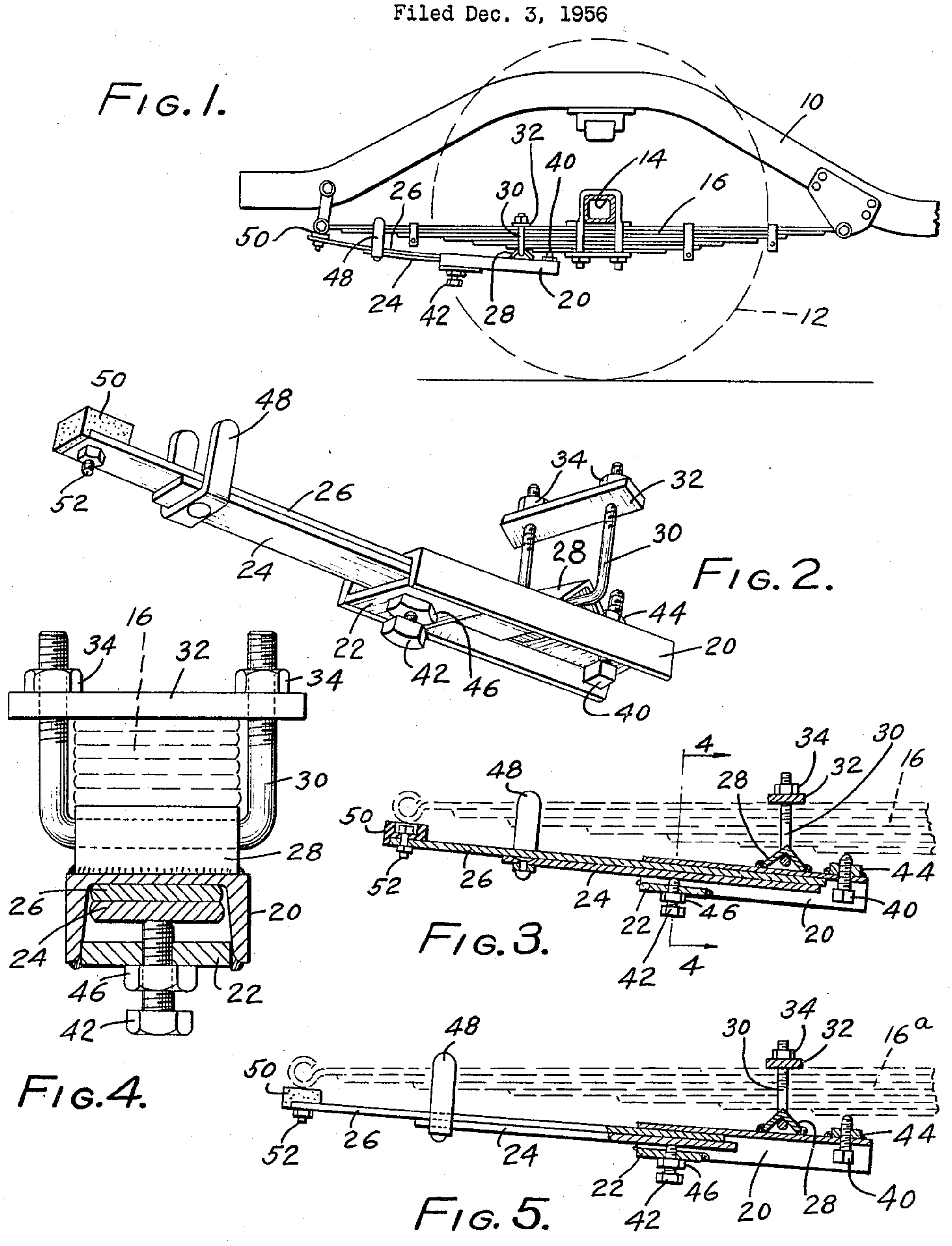
Figure 1 is a side elevation of the improved overload spring of this invention, showing the same as applied to the usual suspension spring of an automobile vehicle.
Figure 2 is a perspective view of the overload spring of Figure 1, showing the same as a separate unit.
Figure 3 is a detail view, partly in section, illustrating more clearly the method of application of the overload spring to the main spring.
Figure 4 is an enlarged section, taken on the plane of the line 4—4 of Figure 3, looking in the direction indicated by the arrows.
Figure 5 is a view somewhat similar to Figure 3, but showing the adjustment of the overload spring in order to have the same conform to a larger main spring.

The reference numeral 10 indicates generally, part of the chassis of an automobile vehicle which may be an automobile, truck, tractor or practically any such apparatus which is spring suspended.

A wheel 12 is indicated, mounted upon an axle, or the like, 14, and which axle is connected to a leaf spring 16 of a construction usually in vehicles of this type.

It has been found that more modern automobiles are presently equipped with springs of approximately minimum strength, both for the purpose of excess weight elimination and also to provide an easier ride for the occupants of the automobile or other vehicle. However, this has its disadvantages in that when an excess load is carried by the vehicle, the springs of lesser strength, have a tendency to sag in an undue manner and may even break. Additionally, such undue load effects the usual spring to such an extent that the car itself, rides too close to the roadway and additional damage to the car, wheels, spring, or occupants may result.

In order to remedy this condition, the overload spring of this invention has been devised and the same includes generally a channel-shaped element 20, as best shown in Figure 2, having a cross-piece 22 welded, or otherwise fastened, therein at one end. A pair of spring leaves 24 and 26 are then placed in the channel 20 above the cross-piece 22 in a slidable relationship to the channel and to each other other. These leaf springs 24 and 26 are of such a length to accommodate practically any type of automotive spring, such as that shown at 16 or 16a (Figure 5).

An angle, or similar piece, 28 is welded, or otherwise securely fixed, to the upper face of the channel 20 in such a manner and position so that a U-bolt 30 can be passed therethrough, all as best shown in Figs. 2 and 4. This U-bolt is adapted to be fitted around the spring 16 as illustrated in Figures 1 and 4 and fastened in position by means of a plate 32 and nuts 34. In this manner, a very secure mounting of the overload spring onto the original spring, can be accomplished.

An adjusting bolt 40 is fitted into a screw-threaded opening in one end of the channel 20 adjacent the angle support 28. The end of this bolt 40 is adapted to contact the underface of the spring 16 so that a turning of the bolt will adjust the relationship between the overload spring and the original spring and about a fulcrum point defined by the angle element 28 and the U-bolt 30.

The two auxiliary spring leaves 24 and 26 are held in the channel 20 by a bolt 42, similar to the bolt 40 and which also, passes through a screw-threaded opening in the cross-plate 22 of the channel 20. Lock-nuts 44 and 46 respectively are provided for maintaining the bolts 40 in desired fixed, adjusted position.

The end of the bolt 42 contacts the lower face of the shorter auxiliary leaf spring 24, as best shown in Figure 3 and when tightened and locked into position, will securely maintain the two spring leaves 24 and 26 in desired adjusted position in the channel 20 and with relation to the original spring 16. This adjustment is made possible by moving one or both the spring leaves 24, in or out of the channel 20 and further adjustment may be had by moving them relatively to each other.

The outer end of the spring element 24 is provided with a U-shaped clip 48, adapted to loosely fit around the adjacent portion of the main spring 16 so that the device can be properly positioned with no danger of accidental dislocation. This clip can later be bent inwardly for an even more secure contact with the spring 16 or 16a.

The outer end of the second auxiliary leaf spring 26 is provided with a resilient pad 50, held in position by means of a bolt, or other fastening element, 52, and this pad can be of rubber or other suitable material. As shown, it contacts the outer end or shackle connection of the original spring 16 or 16a, providing a connection which is free from rattles and noise, and also produces a combination cushioning and gripping association between the related parts.

It will be evident that herein is provided an overload spring for automobiles and similar vehicles which serve an extremely important purpose in supplementing the action of the relatively light springs of modern automobiles, and furthermore, provides additional strength whenever the same is needed. It can be very readily installed with practically only one tool, namely; a simple adjustable wrench, and can simultaneously be adjusted in length to fit the spring of any car. Additional supplementary leaves may be used, if necessary, and in the event that a very heavy load is being carried, two of these springs may be employed, one before and one behind the axle.

In the event that removal becomes necessary, such can be readily accomplished with the same tool and in a very short space of time. Additionally, the device is relatively inexpensive and will fully meet all such requirements, as encountered.

We are aware that many changes may be made and numerous details of construction varied throughout a wide range without departing from the principles of this invention, and we, therefore, do not propose limiting the patent granted hereon otherwise than as necessitated by the prior art.

We claim as our invention:

1. In combination with a vehicle spring, an overload spring in parallel underlying relationship therewith, said overload spring comprising a channel, a plurality of spring leaves slidably mounted in the channel for adjustable positioning therein, means fastening the channel to the vehicle spring, said means including a U-bolt, means fitting the U-bolt onto the vehicle spring, an attachment on the channel for supporting the U-bolt, said attachment contacting the main vehicle spring, forming a fulcrum, and adjusting means for moving the overload spring about said fulcrum, said adjusting means including a bolt screw-threadedly fitted into the channel, the end of said screw-threaded bolt contacting the vehicle spring.

2. A device as described in claim 1, wherein means are provided for fixing the overload spring leaves in adjusted position, said fixing means including a second bolt and a supporting plate for said second bolt, said supporting plate fastened in the channel across the same.

3. A device as described in claim 1, wherein a U-clip is attached to one of the spring leaves positioning the same with regard to the vehicle spring and a cushioning element fixed at the end of one of the spring leaves, said cushioning element contacting the shackle end of the vehicle spring.

References Cited in the file of this patent

UNITED STATES PATENTS

| | | |
|---|---|---|
| 1,099,539 | De La Monte | June 9, 1914 |
| 1,235,703 | Larson | Aug. 7, 1917 |
| 1,419,098 | Arnot | June 6, 1922 |
| 1,679,410 | Delory | Aug. 7, 1928 |
| 1,823,997 | Van Ranst | Sept. 22, 1931 |

FOREIGN PATENTS

| | | |
|---|---|---|
| 332,118 | Great Britain | July 17, 1930 |